United States Patent
Akashi et al.

(10) Patent No.: US 8,601,804 B2
(45) Date of Patent: Dec. 10, 2013

(54) POWER GENERATING APPARATUS OF RENEWABLE ENERGY TYPE

(75) Inventors: Yu Akashi, Tokyo (JP); Takeshi Matsuo, Tokyo (JP); Shinsuke Sato, Tokyo (JP); Takuro Kameda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/294,065

(22) Filed: Nov. 10, 2011

(65) Prior Publication Data

US 2012/0124984 A1 May 24, 2012

Related U.S. Application Data

(63) Continuation of application No. PCT/JP2011/068284, filed on Aug. 11, 2011.

(51) Int. Cl.
*F16D 31/02* (2006.01)

(52) U.S. Cl.
USPC .................................. 60/398; 60/456; 60/494

(58) Field of Classification Search
USPC ......... 60/398, 456, 464, 468, 494; 290/44, 55
See application file for complete search history.

(56) References Cited

U.S. PATENT DOCUMENTS

| | | | |
|---|---|---|---|
| RE23,179 E | 12/1949 | Files | |
| 2,539,862 A | 1/1951 | Rushing | |
| 4,513,673 A | 4/1985 | Brusasca | |
| 5,183,101 A | 2/1993 | Penaluna et al. | |
| 7,168,251 B1 | 1/2007 | Janssen | |
| 7,436,086 B2 | 10/2008 | McClintic | |
| 7,485,979 B1 | 2/2009 | Staalesen | |
| 7,569,943 B2 | 8/2009 | Kovach et al. | |
| 7,656,055 B2 | 2/2010 | Torres et al. | |
| 2002/0117291 A1 | 8/2002 | Cheon | |

(Continued)

FOREIGN PATENT DOCUMENTS

| | | |
|---|---|---|
| DE | 2138376 A1 | 2/1973 |
| DE | 202004016460 U1 | 12/2004 |

(Continued)

OTHER PUBLICATIONS

International Search Report for PCT/JP2011/068284 dated Jan. 11, 2011.

(Continued)

*Primary Examiner* — Michael Leslie
(74) *Attorney, Agent, or Firm* — Kanesaka Berner & Partners, LLP

(57) ABSTRACT

A power generating apparatus includes a rotating shaft, a hydraulic pump driven by the rotating shaft, a hydraulic motor driven by operating oil supplied from the hydraulic pump; and a generator coupled to the hydraulic motor. The apparatus further includes an oil line connected to the hydraulic pump and the hydraulic motor for circulating the operating oil between the hydraulic pump and the hydraulic motor, an oil cooler connected to the oil line for cooling the operating oil by heat exchange with a cooling medium, a cooling-medium line supplying the cooling medium to the oil cooler; a bypass line diverging from at least one of the oil line and the cooling-medium line and merging into at least one of the oil line and the cooling-medium line to bypass the oil cooler; and a flow regulating valve in at least one of the oil line and the cooling-medium line.

16 Claims, 8 Drawing Sheets

(56) References Cited

U.S. PATENT DOCUMENTS

| | | |
|---|---|---|
| 2003/0178176 A1 | 9/2003 | Jenkins et al. |
| 2005/0019166 A1 | 1/2005 | Bervang |
| 2005/0174735 A1 | 8/2005 | Mankaruse et al. |
| 2007/0002538 A1 | 1/2007 | Tomioka |
| 2008/0216301 A1 | 9/2008 | Hansen |
| 2009/0025219 A1 | 1/2009 | Hansen |
| 2010/0018055 A1 | 1/2010 | Lynderup |
| 2010/0028152 A1 | 2/2010 | Numajiri |
| 2010/0032959 A1 | 2/2010 | Nies |
| 2010/0061853 A1 | 3/2010 | Bagepalli |
| 2010/0066088 A1 | 3/2010 | Matsushita |
| 2010/0127502 A1 | 5/2010 | Uchino et al. |
| 2010/0139062 A1 | 6/2010 | Reed |
| 2011/0109094 A1 | 5/2011 | Kenway |
| 2011/0142596 A1 | 6/2011 | Nies |

FOREIGN PATENT DOCUMENTS

| | | |
|---|---|---|
| EP | 1798414 A1 | 6/2007 |
| EP | 2007184 A2 | 12/2008 |
| GB | 24636947 A | 3/2010 |
| JP | 58047181 A | 3/1983 |
| JP | 61-212674 A | 9/1986 |
| JP | 62-20678 A | 1/1987 |
| JP | 2003343417 A | 12/2003 |
| JP | 2004293455 A | 10/2004 |
| JP | 2006152862 A | 6/2006 |
| JP | 2009-91929 A | 4/2009 |
| JP | 2009118666 A | 5/2009 |
| JP | 2009138555 A | 6/2009 |
| JP | 2009185641 A | 8/2009 |
| JP | 2010031722 A | 2/2010 |
| NL | 8101401 A | 10/1982 |
| WO | 2007-053036 A1 | 5/2007 |
| WO | 2009-025420 A1 | 2/2009 |
| WO | 2009058022 A1 | 5/2009 |
| WO | 2009061209 A1 | 5/2009 |
| WO | 2009064192 A1 | 5/2009 |
| WO | 2009128708 A2 | 10/2009 |
| WO | 2010115135 A1 | 10/2010 |
| WO | 2010-0125568 A2 | 11/2010 |

OTHER PUBLICATIONS

European Search Report effective May 3, 2013, as issued in corresponding European Application No. 11797294.3.

International Search Report dated Nov. 1, 2011 issued in PCT/JP2011/068284 with English Translation.

Japanese Notice of Allowance dated Feb. 9, 2012, issued in JP 2011-553194 with English Translation.

Japanese Notice of Allowance dated Apr. 16, 2012, issued in JP 2012-503813 with English Translation.

US Office Action dated Jan. 17, 2013 issued in U.S. Appl. No. 13/363,166.

Notice of Allowance dated Apr. 26, 2013, issued in U.S. Appl. No. 13/363,166.

International Search Report dated May 22, 2012, issued in PCT/JP/2012/054770 with english translation.

Japanese Notice of Allowance dated May 13, 2013, issued in JP 2012-505002 with English Translation.

International Search Report dated Apr. 25, 2012, issued in PCT/2012/001077.

International Search Report dated Nov. 1, 2011, issued in PCT/JP2011/068284.

Notice of Allowance for related U.S. Appl. No. 13/363,166 dated Aug. 5, 2013.

Supplementary European Search Report for EP11810981 dated May 23, 2013.

International preliminary report on patentability mailed Oct. 8, 2013 corresponds to PCT/JP2011/071673.

International preliminary report on patentability mailed Oct. 8, 2013 corresponds to PCT/JP2012/001077.

POWER GENERATING APPARATUS OF RENEWABLE ENERGY TYPE

RELATED APPLICATIONS

The present application is a Continuation of PCT/JP2011/068284, filed Aug. 10, 2011, the disclosure of which is hereby incorporated by reference herein in its entirety.

TECHNICAL FIELD

The present invention relates to a power generating apparatus of a renewable energy type which transmits rotation energy of a rotor from a renewable energy source to a generator, particularly a power generating apparatus of a renewable energy type having a function of cooling a hydraulic transmission.

BACKGROUND ART

From the perspective of preserving the global environment, power generating apparatuses of a renewable energy type such as a wind turbine generator using wind power and a tidal generator using tidal current, river current or ocean current energy are becoming popular. To improve power generation efficiency, it is desired to increase the size of the power generating apparatus of the renewable energy type. Particularly, wind turbine generators installed offshore are expensive to construct in comparison to those installed onshore and thus, it is desired to improve power generation efficiency by increasing the size of the wind turbine generator so as to improve profitability.

With increased output of the generator produced by the larger power generating apparatus of the renewable energy type, heat loss from the generator increases. In the power generating apparatus of the renewable energy type in which the rotation of the rotor is transmitted to the generator by a hydraulic transmission formed by a hydraulic pump and a hydraulic motor, in addition to the heat loss from the generator, there is heat loss from the hydraulic transmission as well. Thus, it is desired to develop a power generating apparatus of a renewable energy type having a function of cooling a heat-producing component such as the generator and the hydraulic transmission.

In view of this, Patent Literature 1 proposes a wind turbine generator having a cooling system for cooling a converter, a transformer and a control unit. The cooling system includes a plurality of heat exchangers installed around a tower. In the heat exchangers, a cooling medium having cooled the converter, the converter, the transformer and the control unit is cooled by heat exchange with atmospheric air.

Patent Literature 2 discloses a cooling device for a wind turbine generator. The cooling device has a heat exchanger to cool a plurality of devices such as a converter, a transformer, a bearing box and a generator. Cooling water cools the devices and then is cooled by the heat exchanger installed on an outer wall of a tower and a nacelle.

CITATION LIST

Patent Literature

[PTL 1]
EP1798414A
[PTL 2]
EP2007184A

SUMMARY OF INVENTION

Technical Problem

Normally, a power generating apparatus of renewable energy type, which generates electric power from renewable energy such as wind power, tidal current, river current and ocean current, is installed where there is significant temperature change of a surrounding environment such as temperature of ambient air, water and so on. This causes a temperature of a temperature of an operating oil of the hydraulic transmission to change. As described above, in the case of the power generating apparatus installed with the above-described cooling device, cold energy such as ambient air and seawater that are around the device is often used and thus, the cooling performance largely depends on the temperature change of the surrounding environment.

The viscosity of the operating oil changes in accordance with the temperature change. At a low temperature, the viscosity of the operating oil becomes high, resulting in significant energy loss in the hydraulic transmission. At a high temperature, the viscosity of the operating oil declines, resulting in accelerating degradation of the operating oil. This leads to a decline of the lubricating property, wear of the sliding part and leaking of the operating oil. Therefore, in the power generating apparatus installed with the hydraulic transmission, it is desired to keep the temperature of the operating oil at an appropriate temperature. However, such technique is not disclosed in Patent Literatures 1 and 2.

In view of the above issues, it is an object of the present invention is to provide a power generating apparatus of renewable energy type which is capable of maintaining an oil temperature of the hydraulic transmission at an appropriate temperature.

Solution to Problem

One aspect of the present invention is a power generating apparatus of renewable energy type which generates power from a renewable energy source. The power generating apparatus may include, but is not limited to:

a rotating shaft which is driven by the renewable energy source;

a hydraulic pump which is driven by the rotating shaft;

a hydraulic motor which is driven by operating oil supplied from the hydraulic pump;

a generator which is coupled to the hydraulic motor;

an oil line which is connected to the hydraulic pump and the hydraulic motor and which circulates the operating oil between the hydraulic pump and the hydraulic motor;

an oil cooler which is connected to the oil line and which cools the operating oil by heat exchange with a cooling medium;

a cooling-medium line which supplies the cooling medium to the oil cooler;

a bypass line which diverges from at least one of the oil line and the cooling-medium line and merges into said at least one of the oil line and the cooling-medium line to bypass the oil cooler; and a flow regulating valve which is provided in said at least one of the oil line and the cooling-medium line that is arranged between a diverging point and a merging point of the bypass line and which regulates a flow rate of at least one of the operating oil and the cooling medium flowing into the oil cooler.

In the above power generating apparatus of the renewable energy type, the bypass line is provided to diverge from at least one of the oil line and the cooling-medium line and the flow rate of one of the operating oil and the cooling medium flowing into the bypass line. Thus, the heat exchange amount between the operating oil and the cooling medium in the oil cooler can be adjusted and thus, the temperature of the operating oil to be cooled in the oil cooler can be adjusted as needed. Even when the temperature of the surrounding environment, the amount of heat released from the generator or the like changes, it is possible to keep the operating oil at the appropriate temperature, and to prevent overcooling of the fluid by putting a limit on the amount of the fluid bypassing the oil cooler. The flow-regulating valve can be fully closed. In such case, the flow rate of the cooling medium entering the oil cooler becomes 0, resulting in cooling failure in the oil cooler.

The above power generating apparatus of the renewable energy type may further include a heat exchanger which is provided in the cooling-medium line and which cools the cooling medium by an ambient fluid which exists around the power generating apparatus of the renewable energy type. A heat exchange amount between the cooling medium and the ambient fluid in the heat exchanger may be adjusted by regulating the flow rate of at least one of the operating oil and the cooling medium.

In this manner, the heat exchanger is provided in the cooling-medium line to cool the cooling medium by an ambient fluid which exists around the power generating apparatus of the renewable energy type. By adjusting the flow rate of one of the cooling medium and the ambient air in the heat exchanger, it is possible to adjust an amount of potential heat of the cooling medium as desired. By this, in addition to adjusting of the flow rate of the operating oil in the oil cooler by means of the bypass line and the flow-regulating valve, the potential heat amount of the cooling medium, i.e. the cooling capacity of the cooling medium is now adjustable and thus, the function of cooling the operation oil can be significantly improved. In the wind turbine generator, heat loss of the oil cooler changes depending on the load of the generator. Therefore, with the above structure, the operation oil can be cooled in accordance with the load of the generator.

The above power generating apparatus of the renewable energy type may further include a generator cooler which is provided in the cooling-medium line and which cools the generator. The cooling medium may be used to cool the oil cooler and the generator cooler.

In this manner, the generator cooler is provided in the cooling-medium line to cool the generator and the cooling medium is used to cool the oil cooler and the generator cooler. Other heat-producing components are cooled by the cooling medium used in the oil cooler. Thus, it is possible to cool other heat-producing components of the power generating apparatus of the renewable energy type integrally, thereby improving the cooling efficiency.

The above power generating apparatus of the renewable energy type may further include:

an operating-oil extraction line which is provided to extract a portion of the operation oil from the oil line and supply the extracted portion of the operating oil to a sliding part of at least one of the hydraulic pump and the hydraulic motor as lubricating oil; and a lubricating-oil cooling device which is provided in the operating-oil extraction line and which cools the extracted portion of the operating oil. The lubricating-oil cooling device may cool the lubricating oil to be supplied to the sliding part to keep a temperature of the lubricating oil lower than a temperature of the operating oil at an inlet of the hydraulic pump.

As described above, the extracted portion of the operation extracted from the oil line is cooled and the cooled portion of the operating oil is used as lubricating oil. Thus, it is no longer necessary to provide a separate lubricating oil supply mechanism such as a lubricant storage tank, resulting in simplified device. The extracted portion of the operation oil to be supplied to the sliding part must have higher viscosity than the operating oil in the hydraulic transmission. The extracted portion of the operating oil is cooled in the lubricating-oil cooling device to increase the viscosity and thus, the extracted portion of the operating oil is fully capable of functioning as lubricating oil.

The above power generating apparatus of the renewable energy type may further include a controller which controls a flow rate of at least one of the operating oil and the cooling-medium flowing into the oil cooler by adjusting an opening degree of the flow regulating valve to adjust a temperature of the operating oil at a prescribed position of the oil line to a set temperature.

By this, it is possible to maintain the temperature of the operating oil flowing in the oil line at the set temperature with precision. The set temperature may be set based on the viscosity of the operating oil. For instance, an upper limit of the set temperature may be set in correspondence to a lower limit of the viscosity that is set such as to suppress a deterioration and leaking of the operating oil, whereas a lower limit of the set temperature may be set in correspondence to an upper limit of the viscosity that is set such as to suppress energy loss caused by viscosity resistance of the operating oil in the hydraulic transmission. In the hydraulic transmission, appropriate temperatures of the operating oil vary depending on a position in the oil line. Thus, a set temperature is set in correspondence to a position in the oil line. It is preferable to set more than one set temperature. In the case where more than one set temperature is set, the set temperatures correspond to the positions on the oil line respectively.

The above power generating apparatus of the renewable energy type may further include tower/nacelle cooler which is provided in at least one of the nacelle which houses the hydraulic pump and the hydraulic motor and the tower which supports the nacelle so as to cool air in said at least one of the nacelle and the tower. The cooling medium may be supplied to the tower/nacelle cooler.

In this manner, the tower/nacelle cooler is provided to cool air in the at least one of the nacelle and the tower and the cooling medium used in the oil cooler is used to the tower/nacelle cooler. Thus, it is possible to cool other heat-producing components of the power generating apparatus of the renewable energy type integrally, thereby improving the cooling efficiency.

The above power generating apparatus of the renewable energy type may further include at least one of a generator cooler and a tower/nacelle cooler which is connected in series or in parallel to the cooling-medium line, said generator cooler cooling the generator, said tower/nacelle cooler cooling one of the tower and the nacelle that house at least the hydraulic pump and the hydraulic motor. The cooling medium may be water to which antifreeze fluid is added and the oil cooler and said at least one of the generator cooler and the tower/nacelle cooler may be cooled by the cooling medium.

In this manner, at least one of a generator cooler and a tower/nacelle cooler is connected to the cooling-medium line and at least one of the generator cooler and tower/nacelle cooler is cooled by the cooling medium used in the oil. Thus, it is possible to cool other heat-producing components of the power generating apparatus of the renewable energy type integrally, thereby improving the cooling efficiency. In such case, water to which antifreeze is added is used as the cooling medium. By this, the cooling medium does not freeze even when an ambient temperature is below freezing, thereby preventing a failure of the cooling system caused by freezing of the system.

The above power generating apparatus of the renewable energy type may further include an air blowing device which is provided in the cooling-medium line and the cooling medium may be air and be introduced to the oil cooler by the air blowing device.

In this manner, the air is used as the cooling medium and the air is introduced to the oil cooler by the air blowing device. By this, it is possible to simplify the structure of the cooling-medium line and also to perform maintenance.

The above power generating apparatus of the renewable energy type may be a wind turbine generator having a tower and a nacelle which is supported by the tower and which houses at least the hydraulic pump. The power generating apparatus of the renewable energy type may include, but is not limited to:

a transformer room which is provided in the tower or on an outer periphery of the tower and in which a transformer is provided; and a transformer-room cooler which is connected in series or in parallel to the cooling-medium line and which cools the air in the transformer room by cold energy of the cooling medium that is cooled by the heat exchanger and supplied to the transformer room via the cooling-medium line. And the cooling medium may be water to which antifreeze is added.

In this manner, the cooling medium used for the oil cooler is also used to cool the transformer room provided in the tower or on the outer periphery of the tower. Thus, it is possible to cool other heat-producing components of the power generating apparatus of the renewable energy type integrally, thereby improving the cooling efficiency. In such case, water to which antifreeze is added is used as the cooling medium. By this, the cooling medium does not freeze even when an ambient temperature is below freezing, thereby preventing a failure of the cooling system caused by freezing of the system.

In the above power generating apparatus of the renewable energy type, the power generating apparatus of the renewable energy type may be a wind turbine generator including a tower and a nacelle which is supported by the tower and which houses at least the hydraulic pump, and the ambient fluid may be air.

Normally, the wind turbine generator is installed where a certain wind speed or higher can be obtained. Therefore, in the wind turbine generator, with use of the air as the ambient fluid for cooling the cooling medium, it is easy to draw the ambient fluid to the heat exchanger.

In the above case, the heat exchanger may be arranged on an upper part of the tower or in the nacelle.

By arranging the heat exchanger on the tower or on the nacelle, which is located high and is subjected to a higher wind speed, it is possible to enhance drawing the ambient fluid into the heat exchanger.

In the above power generating apparatus of the renewable energy type, the power generating apparatus of the renewable energy type may be an offshore wind turbine generator which is installed offshore and which mainly includes a tower and a nacelle supported by the tower and which houses at least the hydraulic pump, and the ambient fluid may be seawater.

In the offshore wind turbine generator, there is plenty of seawater around the wind turbine generator and thus, it is possible to secure a sufficient amount of seawater to be used as the ambient fluid for cooling the cooling medium.

In the above case, the heat exchanger and the transformer room in which the transformer is provided, may be arranged on a lower part of the tower, and the cooling-medium line may extend to the lower part of the tower.

By this, the distance between a component to be cooled and a source of the ambient fluid is reduced, thereby simplifying the piping structure of the cooling-medium circulating line.

In the above power generating apparatus of the renewable energy type, at least one of the tower and the nacelle may be hermetically closed from ambient air.

With the closed structure inside of at least one of the tower and the nacelle, the devices inside are protected from corrosive substance mixed in the ambient air, particularly salt in the case of the offshore wind turbine generator, which can cause corrosion of the devices inside.

Further, in the above power generating apparatus of the renewable energy type, one of the tower and the nacelle may have an intake port and an exhaust port to air-cool air in said one of the tower and the nacelle, and a filter may be provided in the intake port and the exhaust port to block a corrosive substance contained in the ambient air.

By providing the intake port and the exhaust port through which the air is introduced to cool the inside of the tower or the nacelle, it is possible to suppress increase in temperature inside the tower or the nacelle caused by the heat-producing components such as the generator and the hydraulic transmission. By providing the filter in the intake port and the exhaust port to block a corrosive substance contained in the ambient air, it is possible to prevent the corrosive substance contained in the ambient air from entering the tower or the nacelle.

In the above case, at least one fan may be provided in one of the tower and the nacelle; a shutter being capable of opening and closing freely may be provided in the intake port and the exhaust port; when a temperature inside one of the tower and the nacelle is higher than a prescribed temperature, the shutter may open to ventilate the air in said one of the tower and the nacelle in a ventilation mode; and when the temperature inside one of the tower and the nacelle is not higher than the prescribed temperature, the shutter may close to circulate the air in said one of the tower and the nacelle in a circulation mode.

In this manner, when the temperature inside the tower or the nacelle is greater than the prescribed temperature, the shutter is opened in the ventilation mode so as to air the tower or the nacelle through the intake port and the exhaust port by means of the fan. As a result, the temperature inside the tower or the nacelle drops. In contrast, when the measured temperature inside the tower or the nacelle is not greater than the prescribed temperature, the shutter is closed to circulate the air inside the tower or the nacelle by means of the fan in the circulation mode. By this, a regional high-temperature places such as around the generator can be eliminated. Further, the fan can be used for a dual purpose, i.e. the ventilation mode and the circulation mode.

Advantageous Effects of Invention

In the present invention, the bypass line is provided in the oil line so that at least one of the operating oil and the cooling medium bypasses the oil cooler 36 and the flow rate of the fluid (at least one of the operating oil and the cooling medium) is regulated by the flow regulating valve. Thus, the heat exchange amount between the operating oil and the cooling medium in the oil cooler can be adjusted and thus, the temperature of the operating oil to be cooled in the oil cooler can be adjusted freely. Even when the temperature of the surrounding environment, the amount of heat released from the generator or the like changes, it is possible to keep the operating oil at the appropriate temperature.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

First Preferred Embodiment

Figure 1:
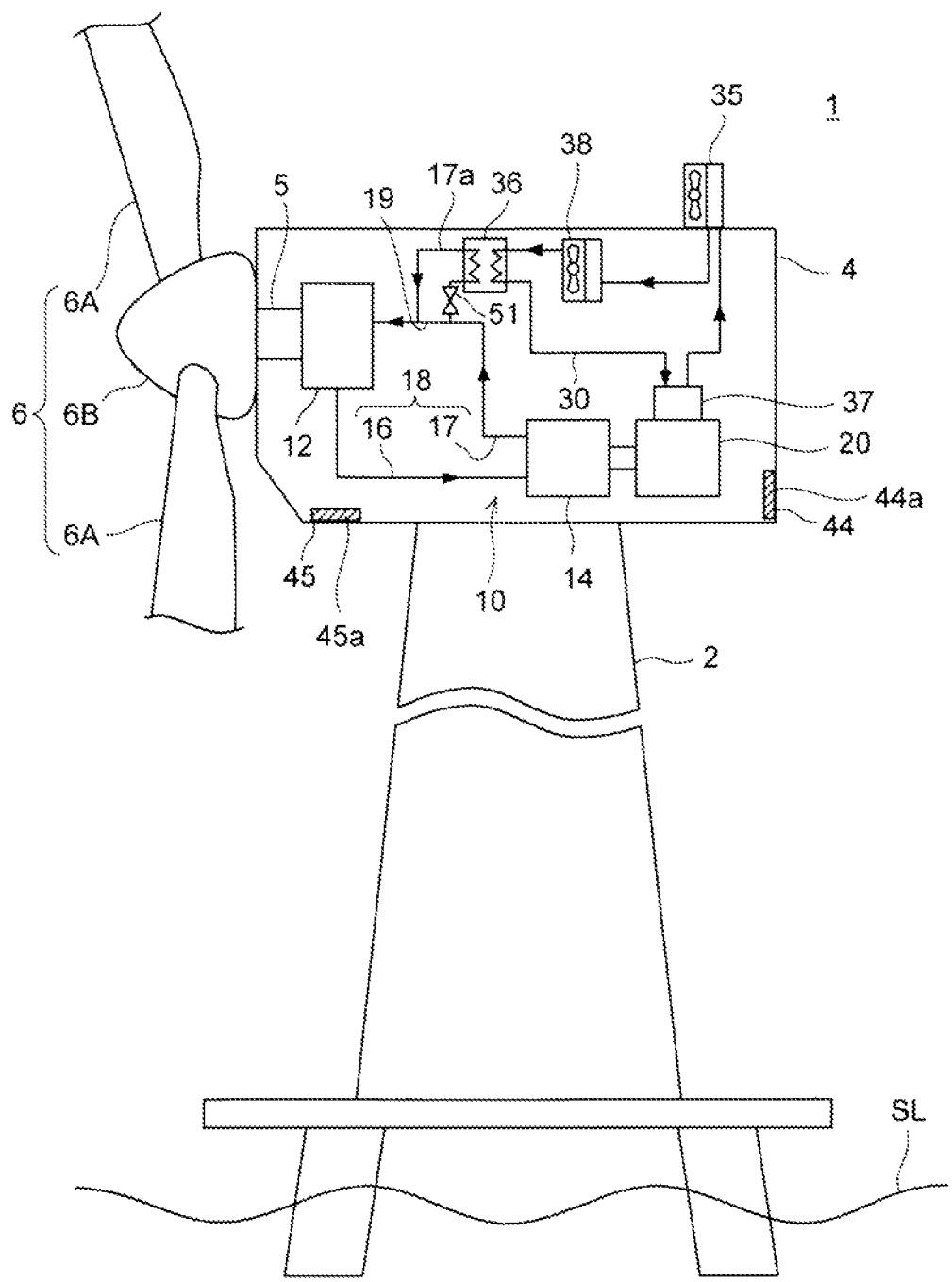
FIG. 1 shows a general structure of a wind turbine generator in relation to a first preferred embodiment of the present invention.
Figure 2:
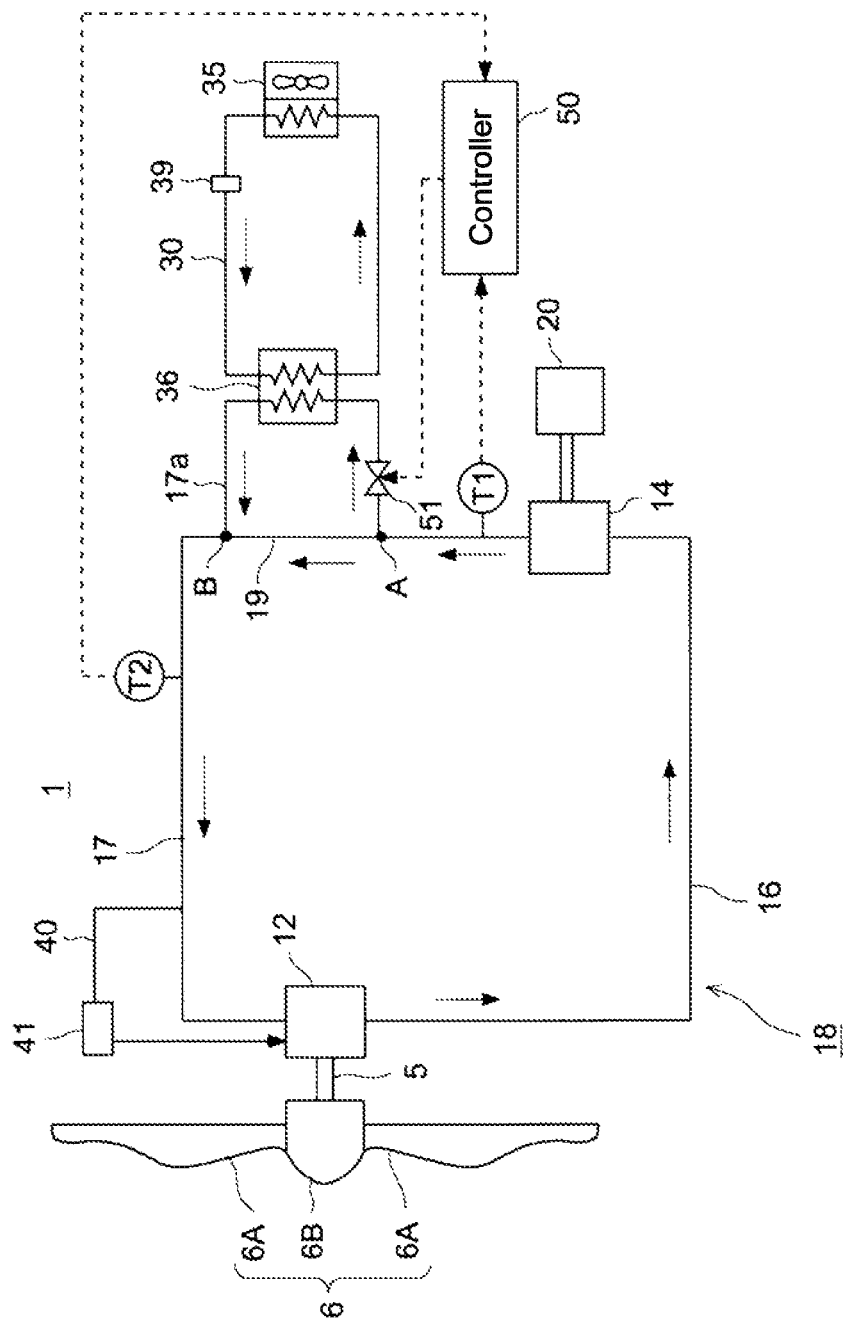
FIG. 2 shows an exemplary structure of an oil line and a cooling-medium line.

A wind turbine generator in relation to a first preferred embodiment of the present invention is explained in reference to FIG. 1 and FIG. 2. FIG. 1 shows a general structure of a wind turbine generator in relation to the first preferred embodiment. FIG. 2 shows an exemplary structure of an oil line and a cooling-medium line.

FIG. 1 shows the wind turbine generator 1 provided essentially with a tower 2, a nacelle 4 supported to the tower 2 and a rotor 6 rotated by wind energy.

FIG. 1 shows the wind turbine generator 1 of an offshore type installed at the seal level (SL). However, the wind turbine generator 1 may be installed on shore.

The rotor 6 is formed by at least one blade 6A, e.g. three blades, and a hub 6B which supports the blade 6A. The hub 6B is connected to a main shaft 5 housed in the nacelle 4. By this, the wind acting on the blade 6A rotates the rotor 6, thereby rotating the main shaft 5 which is connected to the hub 6B.

A hydraulic transmission 10 and a generator 20 are housed in the nacelle 4. As shown in FIG. 2, the hydraulic transmission 10 includes a hydraulic pump 12 connected to the main shaft 5, a hydraulic motor 14 connected to the generator 20 and an oil line 18 arranged between the hydraulic pump 12 and the hydraulic motor 14. The oil line 18 is constituted of a high-pressure oil line 16 connecting an exhaust side of the hydraulic pump 12 and an inlet side of the hydraulic motor 14, and a low-pressure oil line 17 connecting an inlet side of the hydraulic pump 12 and an exhaust side of the hydraulic motor 14.

The hydraulic pump 12 is driven by the main shaft 5 to produce operating oil of high pressure. The high-pressure operating oil is supplied to the hydraulic motor 14 via the high-pressure oil line 16 and then the hydraulic motor 14 is driven by the high-pressure operating oil. Meanwhile, the generator 20 connected to the hydraulic motor 14 is driven to produce electric power in the generator 20. The operating oil ejected from the hydraulic motor 14 is supplied to the hydraulic pump 12 via the low-pressure oil line 17 and then a pressure of the operating oil is increased in the hydraulic pump 12 and the operating oil is fed to the hydraulic motor 14.

An oil cooler 36 is provided on the low-pressure oil line 17 to cool the operating oil by heat exchange with the a cooling medium.

The cooling medium is introduced to the oil cooler 36 via a cooling-medium line 30.

The cooling-medium line 30 is a line that is provided to circulate the cooling medium for cooling a heat-producing component (the hydraulic transmission in FIG. 2) of the wind turbine generator 1. The cooling-medium line 30 is configured as a closed loop. The cooling medium circulating in the cooling-medium line 30 may be a cooling medium made of any liquid or gas. In particular, air is preferable as the cooling medium. In such case, the air is introduced to the oil cooler 36 by a fan 39 provided in the cooling-medium line 30. By this, it is possible to simplify the structure of the cooling-medium line 30 and also to perform maintenance easily. Alternatively, water to which antifreeze is added is preferable as the cooling medium. With use of water having larger specific heat than common gas (such as air) as the cooling medium, an amount of the cooling medium required to circulate in the cooling-medium circulating path 30 is reduced. Further, by adding antifreeze, the cooling medium (water) does not freeze even when an ambient temperature is below freezing, thereby preventing a failure of the cooling system.

On a downstream side of the oil cooler 36 in the cooling-medium line 30, a heat exchanger 35 having a group of heat exchanger tubes is provided. The heat exchanger 35 cools the cooling medium flowing in the heat exchanger tubes by an ambient fluid flowing around the heat exchanger tubes. The ambient fluid is a fluid which exists around the wind turbine generator 1, e.g. air, seawater or the like. In the heat exchanger 35, the cooling medium having passed through the oil cooler 36 enters the heat exchanger tube to be cooled by the ambient fluid flowing around the heat exchanger tube. In such case, it is preferable to use air as the ambient fluid. is arranged inside the duct part of the nacelle 4. In the heat exchanger 35, the cooling medium having passed through the oil cooler 18 and the generator cooler 22 is cooled by heat exchange with the ambient air flowing in the duct part 40 of the nacelle 4. The wind turbine generator 1 is often installed where a certain wind speed and higher can be obtained. Therefore, in the wind turbine generator 1, with use of the air as the ambient fluid for cooling the cooling medium, it is possible to draw the ambient fluid to the heat exchanger 35 easily. For the offshore wind turbine generator, seawater is preferably used as the ambient fluid. As for the offshore wind turbine generator, there is plenty of seawater around the wind turbine generator and thus, it is possible to secure a sufficient amount of seawater as the ambient fluid for cooling the cooling medium.

In the wind turbine generator 1, the heat exchanger 35 may be installed on an upper part of the tower 2 or on the nacelle 4. By arranging the heat exchanger 35 on the tower 2 or on the nacelle which is located high and is subjected to a higher wind speed, it is possible to enhance drawing the ambient fluid into the heat exchanger.

A heat exchange amount between the cooling medium and the ambient fluid (an amount of heat exchanged between the cooling medium and the ambient fluid) in the heat exchanger 35 may be adjusted by adjusting at least one of the flow rate of the cooling medium and the flow rate of the ambient fluid. Specifically, the ambient air is drawn into the heat exchanger by the fan, and in the case of cooling the operating oil by heat exchange with the ambient air, a temperature of the operating oil or the ambient air in the oil line 18 is inputted to the controller and based on the inputted temperature, the controller controls the rotation speed of the fan so as to adjust the flow rate of the ambient air to the heat exchanger 35.

By adjusting the flow rate of one of the cooling medium and the ambient air in the heat exchanger 35, it is possible to adjust an amount of potential heat of the cooling medium as desired. By this, the potential heat amount of the cooling medium, i.e. the cooling capacity of the cooling medium is now adjustable and thus, the function of cooling the operation oil can be significantly improved. In the wind turbine generator 1, heat loss of the oil cooler 36 changes depending on the load of the generator 20. Therefore, with the above structure, the operation oil can be cooled in accordance with the load of the generator. Only one heat exchanger 35 is shown in the drawing. However, it is possible to provide more than one heat exchanger 35 depending on an expected amount of heat generated from the heat-producing component of the wind turbine generator 1. In such case, the heat exchangers 35 may be connected to the cooling-medium line 30 in parallel or in series.

Further, a bypass line 19 which diverges from the low-pressure oil line 17 at a branching point A and merges into the low-pressure oil line 17 at a merging point B is connected to the oil line 18. In the bypass line 19, a portion of the operating oil that has split at the branching point A, merges back into the low-pressure oil line 17 at the merging point B.

Furthermore, a flow-regulating valve is provided in the low-pressure oil line 17a between the branching point A and the merging point B to adjust the flow rate of the operating oil entering the oil cooler 36.

In this manner, by adjusting the flow rate of the operating oil to the bypass line 19 by means of the flow regulating valve 51, the heat exchange amount between the operating oil and the cooling medium in the oil cooler 36 can be adjusted and thus, it is possible to keep the operating oil at an appropriate temperature by cooling the operating oil. Alternatively, the flow-regulating valve 51 may be provided at the branching point A. In such case, a three-way valve may be used as the flow-regulating valve 51.

A controller 50 is provided to control an opening degree of the flow-regulating valve 51. The temperature of the operating oil is measured at a certain position in the oil line 18 by a temperature sensor T1 or T2. The controller 50 controls the opening degree of the flow-regulating valve 51 so that the measured temperature of the operating oil becomes a prescribed temperature having been set in advance. By this, the flow rate of the operating oil entering the oil cooler 36 is adjusted. The prescribed temperature may be set based on the viscosity of the operating oil. For instance, an upper limit of the set temperature may be set in correspondence to a lower limit of the viscosity that is set such as to suppress a deterioration and leaking of the operating oil, whereas a lower limit of the set temperature may be set in correspondence to an upper limit of the viscosity that is set such as to suppress energy loss caused by viscosity resistance of the operating oil in the hydraulic transmission.

In the hydraulic transmission, appropriate temperatures of the operating oil vary depending on a position in the oil line 18. Thus, a set temperature is set in correspondence to a position in the oil line 18. It is preferable to set more than one set temperature. In the case where more than one set temperature is set, the set temperatures correspond to the positions on the oil line respectively. Specifically, the set temperatures are set in correspondence to the temperature sensors T1 and T2 arranged on different positions on the oil line 18.

The temperature sensors T1 and T2 are arranged on the low-pressure oil line 17 of the oil line 18. Alternatively, the temperature sensors T1 and T2 may be provided in the high-pressure oil line 16.

The flow-regulating valve 51 can be fully closed. In such case, the flow rate of the operating oil entering the oil cooler 36 becomes 0, resulting in cooling failure in the oil cooler 36.

In reference to FIG. 1, the cooling-medium line 30 that supplies the cooling medium to the oil cooler 36 extends to a vicinity of the heat-producing component other than the hydraulic transmission 10. The cooling medium flowing in the cooling-medium line 30 may be used to cool more than one heat-producing components.

As other heat-producing components, there are, for instance, a generator cooler 37, a nacelle cooler 38, a tower cooler and so on. In the drawing, there is one heat exchanger 35 and the cooling medium line 30 is arranged in series with respect to each of the heat-producing components. However, in some cases, it is preferable to arrange the cooling-medium line 30 in parallel depending on a temperature and a flow rate that are required by each of the heat-producing components.

The generator cooler 37 is configured as a cooling jacket provided around the generator 20, for instance. The generator cooler 37 cools the generator 20 by heat exchange with the cooling medium supplied through the cooling-medium line 30. By this, it is possible to cool the generator 20 effectively.

The nacelle cooler 38 is configured as a heat exchanger with a fan that is provided inside the nacelle and has a fan and a group of heat exchanger tubes. The air in the nacelle 4 is drawn in (or forced in) by the fan and then is cooled by heat exchange with the cooling medium supplied to the heat exchanger tubes through the cooling-medium line 30. By this, the air in the nacelle 4 which was heated by the heat released from the heat-producing components of the wind turbine generator 1 can be cooled effectively. The tower cooler has essentially the same structure as the nacelle cooler 38.

In this manner, the cooling devices for cooling other heat-producing components such as the generator cooler 37 and the nacelle cooler 38 are connected to the cooling-medium line 30 so that other heat-producing components are cooled by the cooling medium used in the oil cooler 36. Thus, it is possible to cool other heat-producing components of the wind turbine generator 1 integrally, thereby improving the cooling efficiency.

In FIG. 1, the generator cooler 37 and the nacelle cooler 38 are illustrated by example as the heat-producing components. However, this is not limitative and the above cooling system can be applied to other heat-producing components as well.

As shown in FIG. 2, the wind turbine generator 1 may include an operating-oil extraction line 40 which is provided to extract a portion of the operating oil from the low-pressure oil line 17 and supply the extracted portion of the operating oil to a sliding part of at least one of the hydraulic pump 12 and the hydraulic motor 14. On the operating-oil extraction line 40, an oil cooler 41 is provided to further cool the extracted portion of the operating oil. The oil cooler 41 cools the extracted portion of the oil flowing in the operating-oil extraction line 40 to a low temperature by heat exchange with the operating oil flowing in the low-pressure oil line 17. The extracted portion of the oil having been cooled is supplied to the sliding part as lubricating oil. The sliding part, herein, refers to a member arranged between a rotation member and a bearing which slidably supports the rotation member. The rotation member includes a mains haft coupled to the rotor, a rotation shaft coupled to the generator 20 and the like.

As described above, the extracted portion of the operation extracted from the oil line 18 such as the low-pressure oil line 17 is cooled by the oil cooler 41. By using the cooled portion of the operating oil as lubricating oil, it is no longer necessary to provide a separate lubricating oil supply mechanism such as a lubricant storage tank, resulting in simplified device. The extracted portion of the operation oil to be supplied to the sliding part must have higher viscosity than the operating oil in the hydraulic transmission. The extracted portion of the operating oil is cooled in the oil cooler 41 to increase the viscosity and thus, the extracted portion of the operating oil is fully capable of functioning as lubricating oil.

In FIG. 1, an inside of at least one of the tower 2 and the nacelle 4 is closed from the ambient air. With the closed structure inside of at least one of the tower 2 and the nacelle 4, the devices inside of at least one of the tower 2 and the nacelle 4 are protected from corrosive substance mixed in the ambient air, particularly salt in the case of the offshore wind turbine generator, which can cause corrosion of the devices inside.

Further, as shown in FIG. 1, on an outer wall of the nacelle, an intake port 44 and an exhaust port may be provided. The intake port 44 and the exhaust port 45 may be configured to be open and closed freely. When the intake port 44 and the exhaust port 45 are open, the air (the ambient air) passes through the nacelle 4 to perform ventilation. In this manner, the air in the nacelle 4, which was heated by the heat-producing component housed in the nacelle, can be cooled. In the intake port 44 and the exhaust port 45, filters 44a and 45a may be provided respectively to block corrosive substance mixed in the ambient air.

FIG. 1 illustrates the structure where the intake port 44 and the exhaust port 45 are provided in the nacelle 4. However, this is not limitative and the intake port 44 and the exhaust port 45 may be provided on a side of the tower 2. By providing the intake port 44 and the exhaust port 45 through which the air is introduced to cool the inside of the tower 2 or the nacelle 4, it is possible to suppress increase in temperature inside the tower 2 or the nacelle 4 caused by the heat-producing components such as the generator 20 and the hydraulic transmission 10.

In addition to the above structure, at least one fan 48 may be provided inside the nacelle 4 and shutters 46 and 48 that are openable may be provided in the intake port 44 and the exhaust port 45.

Figure 3A:
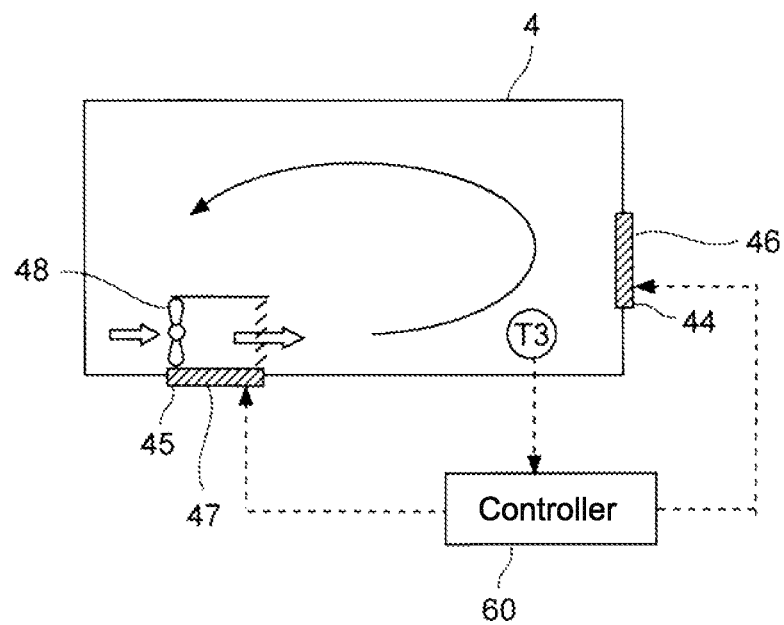
FIG. 3A shows a circulation mode of an air-cooling mechanism in a nacelle.
Figure 3B:
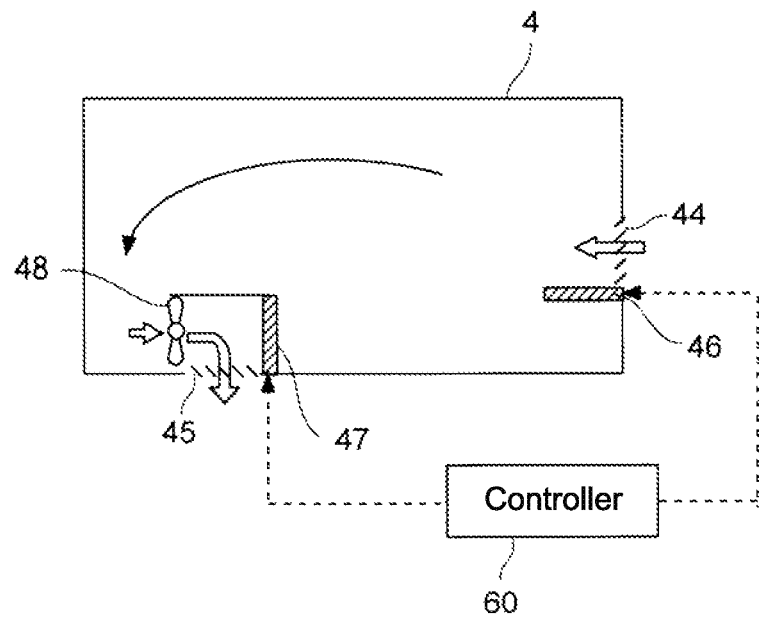
FIG. 3B shows a ventilation mode of the air-cooling mechanism in the nacelle.

FIG. 3A shows a circulation mode of an air-cooling mechanism in the nacelle 4. FIG. 3B shows a ventilation mode of the air-cooling mechanism in the nacelle 4. In the air-cooling mechanism, a controller 60 controls an opening and closing of the shutters 46 and 47. To the controller 60, the temperature inside the nacelle 4 measured by the temperature sensor T3 is inputted. When the measured temperature is exceeds a prescribed temperature, the controller 60 controls the shutters 46 and 47 to open so as to ventilate the nacelle 4 in the ventilation mode as shown in FIG. 3B. When the measured temperature is not greater than the prescribed temperature, the controller 60 controls the shutters 46 and 47 to close so as to circulate the air inside the nacelle 4 in the circulation mode as shown in FIG. 3A.

In this manner, when the temperature inside the tower 2 or the nacelle 4 is greater than the prescribed temperature, the shutters 46 and 47 are opened in the ventilation mode so as to air the tower 2 or the nacelle 4 through the intake port 44 and the exhaust port 45 by means of the fan 48. As a result, the temperature inside the tower 2 or the nacelle 4 drops. In contrast, when the measured temperature inside the tower 2 or the nacelle 4 is not greater than the prescribed temperature, the shutters 46 and 47 are closed to circulate the air inside the tower or the nacelle 4 by means of the fan 48 in the circulation mode. By this, a regional high-temperature places such as around the generator can be eliminated. Further, the fan 48 can be used for a dual purpose, i.e. the ventilation mode and the circulation mode.

In the preferred embodiment as described above, the bypass line 19 is provided in the oil line 18 so that at least one of the operating oil and the cooling medium bypasses the oil cooler 36 and the flow rate of the fluid (at least one of the operating oil and the cooling medium) is regulated by the flow regulating valve 51. Thus, the heat exchange amount between the operating oil and the cooling medium in the oil cooler 36 can be adjusted and thus, the temperature of the operating oil to be cooled in the oil cooler 36 can be adjusted freely. Even when the temperature of the surrounding environment, the amount of heat released from the generator or the like changes, it is possible to keep the operating oil at the appropriate temperature, and it is possible to prevent overcooling of the fluid by putting a limit on the amount of the fluid bypassing the oil cooler.

In the first preferred embodiment, the bypass line 19 is provided in the oil line 18. However, this is not limitative and the bypass line may be provided on a side of the cooling-medium line 30.

Figure 4:
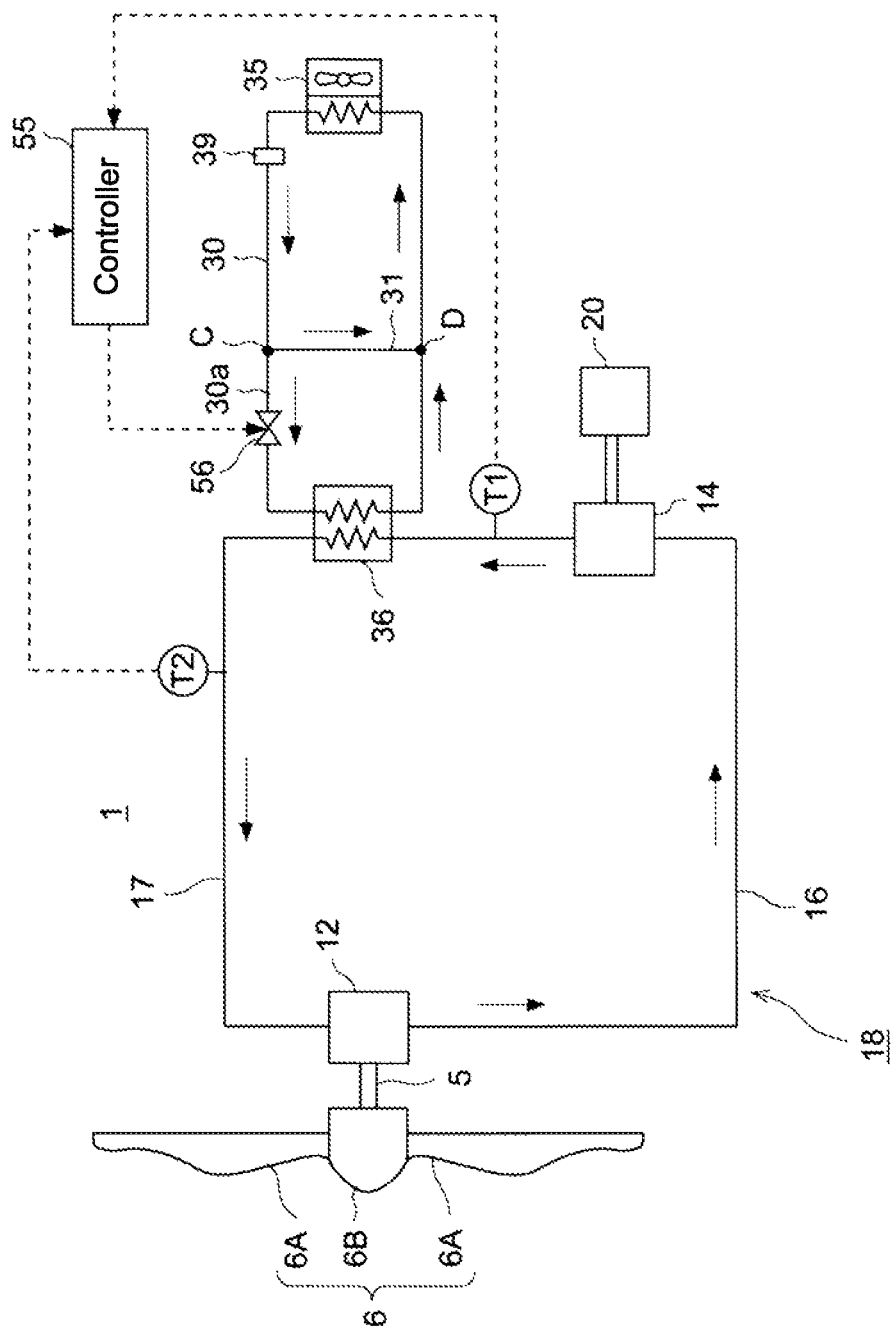
FIG. 4 shows another exemplary structure of the oil line and the cooling-medium line.

The case is illustrated in FIG. 4. A bypass line 31 is connected to the cooling-medium line 30. The bypass line 31 diverges from the cooling-medium line 30 at a branching point C and merges into the cooling-medium line 30 at a merging point D. In the bypass line 31, a portion of the cooling medium that has split at the branching point C streams and merges back into the cooling-medium line 30 at the merging point D.

Further, a flow-regulating valve 56 is provided in the cooling-medium line 30a between the branching point C and the merging point D to adjust the flow rate of the cooling medium entering the oil cooler 36.

A controller 55 may be provided to control the opening degree of the flow-regulating valve 56. The temperature of the operating oil is measured at a certain position in the oil line 18 by the temperature sensor T1 or T2. The controller 55 controls the opening degree of the flow-regulating valve 56 so that the measured temperature of the operating oil becomes a set temperature having been set in advance. By this, the flow rate of the cooling medium entering the oil cooler 36 is adjusted.

The flow-regulating valve 56 can be fully closed. In such case, the flow rate of the cooling medium entering the oil cooler 36 becomes 0, resulting in cooling failure in the oil cooler 36.

By adjusting the flow rate of the cooling-medium entering the oil cooler 36 by means of the flow-regulating valve 56, it is possible to keep the operating oil at an appropriate temperature. By putting a limit on the flow rate of the cooling medium entering the oil cooler 36, the operating oil is prevented from being cooled beyond a certain point, thereby preventing overcooling physically.

In addition to the above structure of the first preferred embodiment, the wind turbine generator further includes a following structure.

Figure 5:
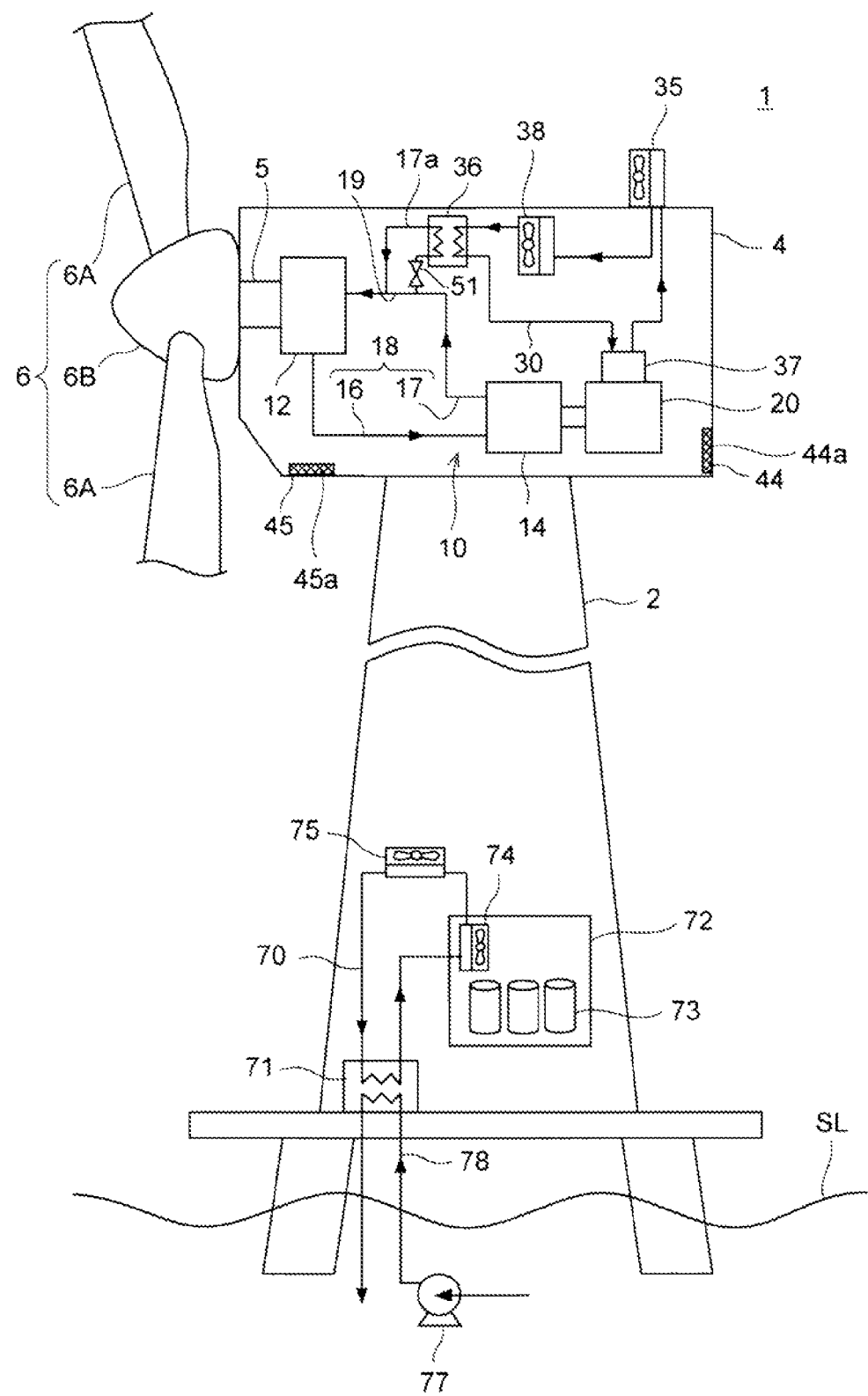
FIG. 5 shows a general structure of a wind turbine generator equipped with another cooling mechanism for a transformer room.

As shown in FIG. 5, the wind turbine generator 1 includes a transformer-room cooler 74 which cools a transformer room 72. The transformer room 72 is a space in which a transformer for transforming a voltage generated in the generator 20. The temperature in the transformer room 72 rises due to the heat release from the transformer 73. In view of this, the transformer-room cooler 72 is provided in the transformer room 72. The transformer-room cooler 72 is configured to perform heat exchange between the cooling medium flowing in a second cooling-medium line 70 and the air in the transformer room 72. To the second cooling-medium line 70, the transformer-room cooler 72 and a heat exchanger 71 are connected. The heat exchanger 71 is connected to a seawater supply line 78 for supplying seawater. The seawater is pumped by a pump 77 and supplied to the seawater supply line 78. In the heat exchanger 71, the cooling medium is cooled by heat exchange with the seawater. Further, a tower cooler 75 provided in the tower 2 may be connected to the second cooling-medium line 70 to cool the air in the tower 2.

Figure 6:
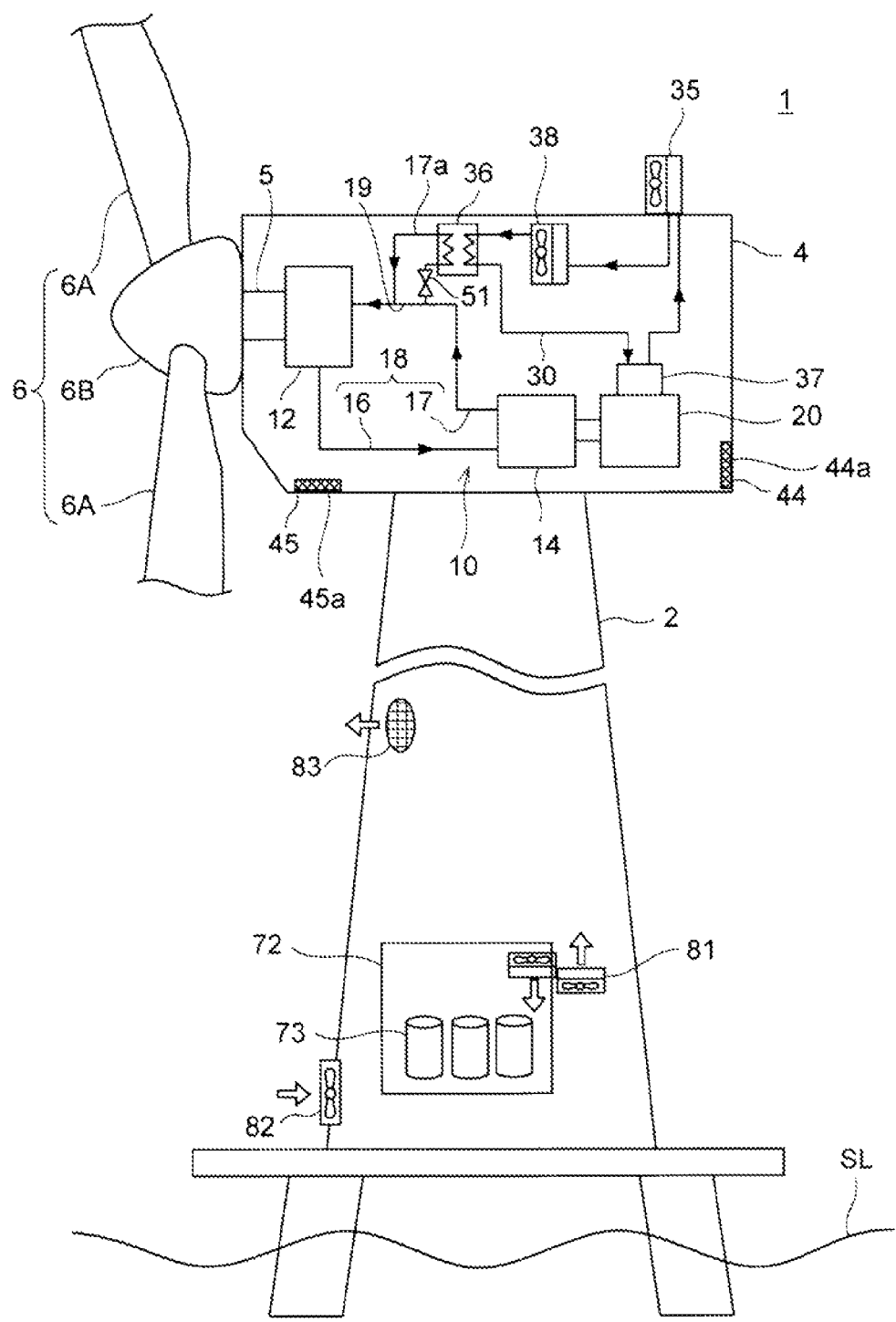
FIG. 6 shows a general structure of a wind turbine generator equipped with another cooling mechanism for a transformer room.

Alternatively, as shown in FIG. 6, the wind turbine generator 1 may be additionally provided with a fan 82 supplying ambient air into the tower 2 and an exhaust port 83 exhausting the air from the tower so as to ventilate the tower 2 as well as a heat exchanger 81 performing heat exchange between the air in the tower 2 and the air in the transformer room 72.

With the structure for cooling the inside of the transformer room 72 as shown in FIG. 5 and FIG. 6, a majority of the heat-producing components of the wind turbine generator 1 can be cooled, thereby achieving a smooth operation of the wind turbine generator. By independently providing the cooling-medium line 18 which mainly cools the hydraulic transmission and one of the second cooling-medium line 70 and the heat exchanger 81 which mainly cool the inside of the transformer room 72, it is possible to choose a most appropriate cooling device among the cooling-medium lines 18, 70 and the heat exchanger 81. In this manner, the cooling-medium lines 18, 70 and the heat exchanger 81 are provided independently and the length of pipes for the cooling medium is optimally set and thus, the piping can be simplified.

Second Preferred Embodiment

Next, a wind turbine generator in relation to a second preferred embodiment is explained. Except for the cooling mechanism within the transformer room 72, the wind turbine generator of the second preferred embodiment has essentially the same structure as the wind turbine generator 1 of the first preferred embodiment described above. The same components that are described in the first preferred embodiment are indicated with the same reference numerals and are not explained further. In the second preferred embodiment, components that are different from the first preferred embodiment are mainly explained.

Figure 7:
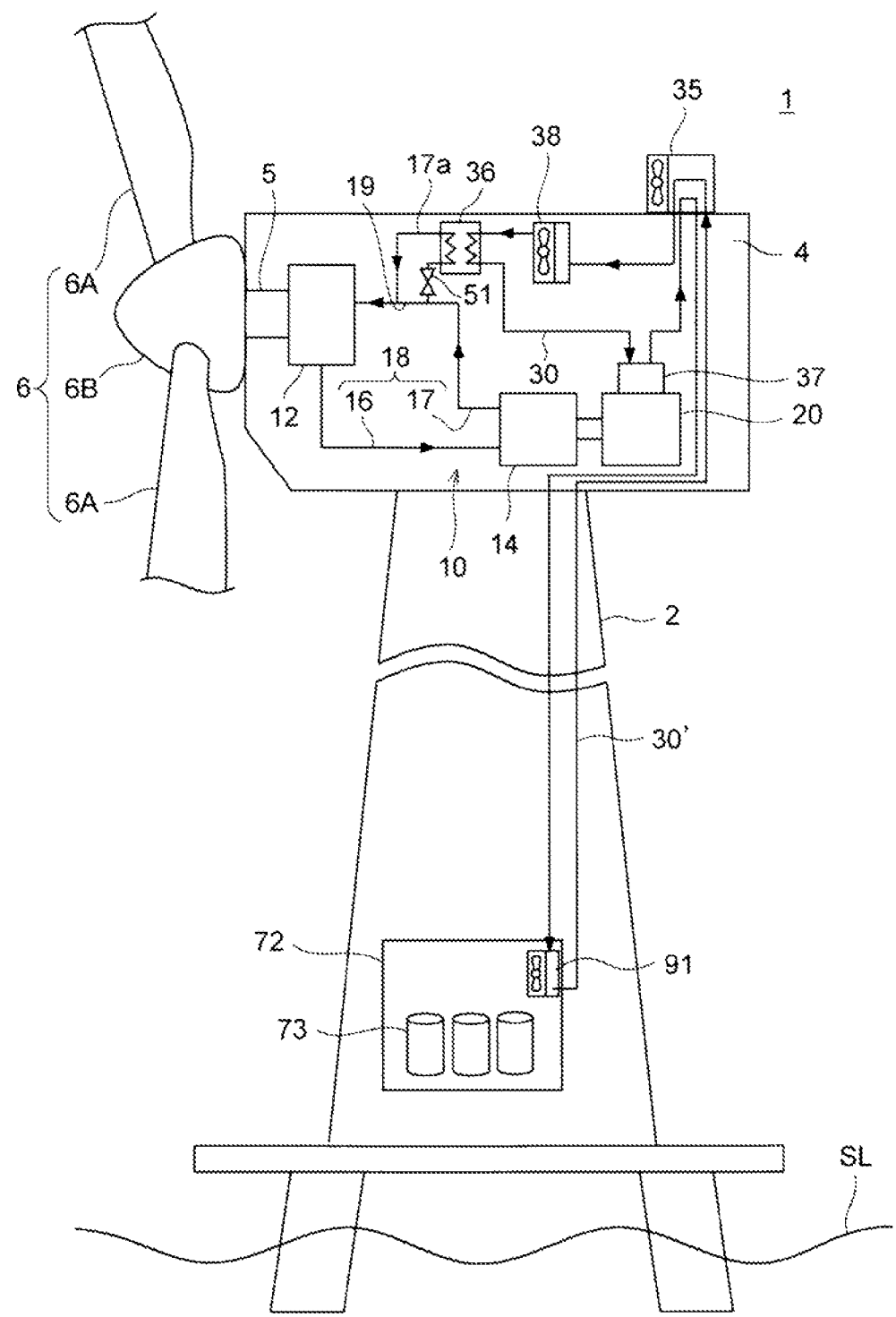
FIG. 7 shows a general structure of a wind turbine generator in relation to a second preferred embodiment of the present invention.

As shown in FIG. 7, the wind turbine generator 1 is provided with a transformer-room cooler 91 which cools the transformer room 72. The transformer-room cooler 91 is connected to the cooling-medium line 30 which supplies the cooling medium to the oil cooler 36. In the drawing, the cooling-medium line 30 of the oil cooler side and another cooling-medium line 30' of the transformer room side are connected in the heat exchanger 35 which performs heat exchange between the ambient fluid and the cooling medium. In the preferred embodiment, the cooling medium line 30 and another cooling-medium line 30' are connected in series. However, this is not limitative and, for instance, the cooling medium line 30 and another cooling-medium line 30' may be connected in parallel via a cooling-medium storage tank.

The transformer-room cooler 91 is provided with a group of heat exchanger tubes in which the cooling medium flows and a fan which forms a flow of the air to direct the air in the transformer room 72 toward a surrounding area of the group of heat exchanger tubes. With the structure, the flow of the air having been cooled by the group of heat exchanger tubes circulates in the transformer room 72 to cool the inside of the transformer room 72 heated by the heat released from the transformer 73. In the drawing, the transformer room 72 is arranged in the tower 2. However, this is not limitative and the transformer room 72 may be arranged on an outer periphery of the tower 2.

Figure 8:
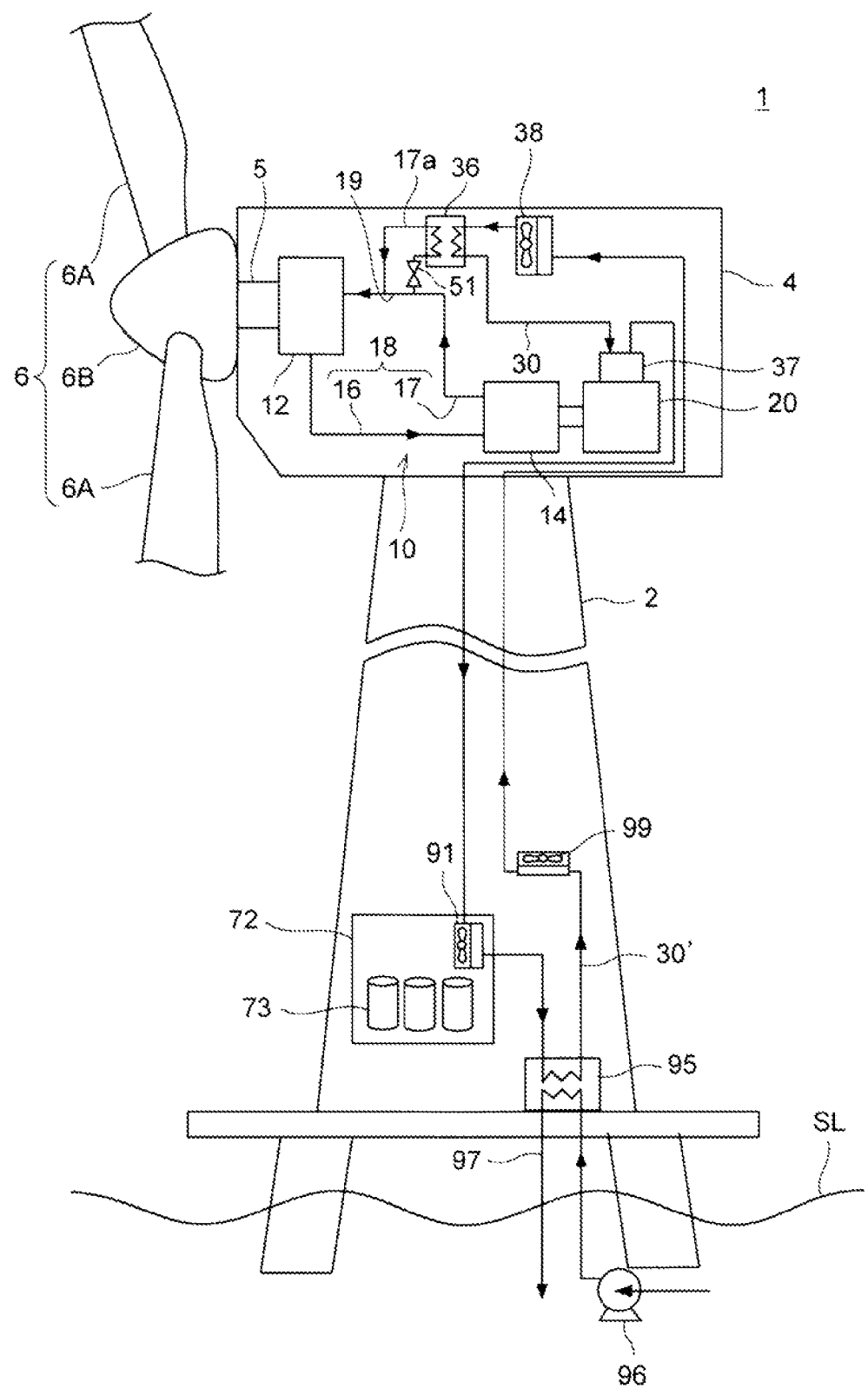
FIG. 8 shows a general structure of a wind turbine generator in relation to a modification of the second preferred embodiment of the present invention.

Alternatively, the wind turbine generator 1 may be provided additionally with at least one of a nacelle-side heat exchanger 35 and a tower-side heat exchanger 95 which are connected to the cooling medium lines 30 and 30' respectively as shown in FIG. 8. The nacelle-side heat exchanger 35 is provided on a periphery of the nacelle and cools the cooling medium by heat exchange with the ambient air. The tower-side heat exchanger 95 is arranged at a bottom part of the tower 2 and cools the cooling medium by heat exchange with seawater. To the tower-side heat exchanger 95, a seawater supply line 97 is connected to supply the seawater sweater pumped by a pump 96. To the cooling-medium line 30', a tower cooler 99 may be connected to cool the air in the tower 2.

In this manner, the cooling medium used in the oil cooler 36 is also used to cool the transformer room 72 which is arranged in or on the outer periphery of the tower 2. Thus, it is possible to cool other heat-producing components of the wind turbine generator 1 integrally, thereby improving the cooling efficiency. In such case, water to which antifreeze is added is preferable used as the cooling medium. By this, the cooling medium does not freeze even when an ambient temperature is below freezing, thereby preventing a failure of the cooling system caused by freezing of the system. In the drawing, there is one heat exchanger 35 or 95 and the cooling medium line 30 or 30' is arranged in series with respect to each of the heat-producing components. However, in some cases, it is preferable to arrange the cooling-medium line 30, 30' in parallel depending on a temperature and a flow rate that are required by each of the heat-producing components.

While the present invention has been described with reference to exemplary embodiments, it is obvious to those skilled in the art that various changes may be made without departing from the scope of the invention.

For example, in the above preferred embodiments, the present invention is applied to the wind turbine generator. However, the present invention is also applicable to a tidal generator. The "tidal generator" herein refers to a generator which is installed at places such as the sea, a river or a lake and which generates power from energy of tidal current. The tidal generator is essentially the same as the wind turbine generator 1 except for the rotor 2 being rotated by the tidal current instead of the wind. The components that are in common with the wind turbine generator 1 are indicated with the same reference numerals. The tidal generator is provided with the rotor 6 rotated by the tidal current acting thereon, the hydraulic transmission 10 increasing the rotation speed of the rotor 6, the generator 20 generating electric power, the nacelle 4 housing at least one of the hydraulic pump 12 of the hydraulic transmission 10 and the tower 2 supporting the nacelle 4. Further, the tidal generator is provided with the oil line circulating the operating oil between the hydraulic pump and the hydraulic motor of the hydraulic transmission 10, the oil cooler 36 connected to the oil line 18 and cooling the operating oil, the cooling-medium line 30 supplying the cooling medium to the oil cooler 36 and the bypass line connected to one of the oil line 18 and the cooling-medium line 30. Furthermore, the flow rate of at least one of the operating oil and the cooling medium entering the oil cooler 36 is adequately adjusted by the flow-regulating valve. By this, even in the tidal generator, it is possible to keep the temperature of the operating oil of the hydraulic transmission appropriately.

REFERENCE SIGNS LIST

1 Wind turbine generator
2 Tower
4 Nacelle
5 Main shaft
6 Rotor
6A Blade
6B Hub
10 Hydraulic transmission
12 Hydraulic pump
14 Hydraulic motor
16 High-pressure oil line (HP oil line)
17, 17a Low-pressure oil line (LP oil line)
18 Oil line
19 Bypass line
20 Generator
30 Cooling-medium line
31 Bypass line
35 Heat exchanger
36 Oil cooler
37 Generator cooler
38 Nacelle cooler
50, 55 Controller
51,56 Flow regulating valve

The invention claimed is:

1. A power generating apparatus of renewable energy type which generates power from a renewable energy source, comprising:
   a rotating shaft which is driven by the renewable energy source;
   a hydraulic pump which is driven by the rotating shaft;
   a hydraulic motor which is driven by operating oil supplied from the hydraulic pump;
   a generator which is coupled to the hydraulic motor;
   an oil line which is connected to the hydraulic pump and the hydraulic motor and which circulates the operating oil between the hydraulic pump and the hydraulic motor;
   an oil cooler which is connected to the oil line and which cools the operating oil by heat exchange with a cooling medium;
   a cooling-medium line which supplies the cooling medium to the oil cooler;
   a bypass line which diverges from at least one of the oil line and the cooling-medium line and merges into said at least one of the oil line and the cooling-medium line to bypass the oil cooler; and
   a flow regulating valve which is provided in said at least one of the oil line and the cooling-medium line that is arranged between a diverging point and a merging point of the bypass line and which regulates a flow rate of at least one of the operating oil and the cooling medium flowing into the oil cooler.

2. The power generating apparatus of the renewable energy type according to claim 1, further comprising:
   a heat exchanger which is provided in the cooling-medium line and which cools the cooling medium by an ambient fluid which exists around the power generating apparatus of the renewable energy type,
   wherein a heat exchange amount between the cooling medium and the ambient fluid in the heat exchanger is adjusted by regulating the flow rate of at least one of the operating oil and the cooling medium.

3. The power generating apparatus of the renewable energy type according to claim 1, further comprising:
   a generator cooler which is provided in the cooling-medium line and which cools the generator,
   wherein the cooling medium is used to cool the oil cooler and the generator cooler.

4. The power generating apparatus of the renewable energy type according to claim 1, further comprising:
   an operating-oil extraction line which is provided to extract a portion of the operation oil from the oil line and supply the extracted portion of the operating oil to a sliding part of at least one of the hydraulic pump and the hydraulic motor as lubricating oil; and
   a lubricating-oil cooling device which is provided in the operating-oil extraction line and which cools the extracted portion of the operating oil,
   wherein the lubricating-oil cooling device cools the lubricating oil to be supplied to the sliding part to keep a temperature of the lubricating oil lower than a temperature of the operating oil at an inlet of the hydraulic pump.

5. The power generating apparatus of the renewable energy type according to claim 1, further comprising:
   a controller which controls a flow rate of at least one of the operating oil and the cooling-medium flowing into the oil cooler by adjusting an opening degree of the flow regulating valve to adjust a temperature of the operating oil at a prescribed position of the oil line to a set temperature.

6. The power generating apparatus of the renewable energy type according to claim 1, further comprising:
   a tower/nacelle cooler which is provided in at least one of (i) a nacelle which houses the hydraulic pump and the hydraulic motor and (ii) a tower which supports the nacelle so as to cool air in said at least one of the nacelle and the tower,
   wherein the cooling medium is supplied to the tower/nacelle cooler.

7. The power generating apparatus of the renewable energy type according to claim 1, further comprising:
   at least one of a generator cooler and a tower/nacelle cooler which is connected in series or in parallel to the cooling-medium line, said generator cooler cooling the generator, said tower/nacelle cooler cooling one of a tower and a nacelle that house at least the hydraulic pump and the hydraulic motor,
   wherein the cooling medium is water to which antifreeze fluid is added and the oil cooler and said at least one of the generator cooler and the tower/nacelle cooler are cooled by the cooling medium.

8. The power generating apparatus of the renewable energy type according to claim 1, further comprising:
   an air blowing device which is provided in the cooling-medium line,
   wherein the cooling medium is air and the cooling medium is introduced to the oil cooler by the air blowing device.

9. The power generating apparatus of the renewable energy type according to claim 2,
  wherein the power generating apparatus of the renewable energy type is a wind turbine generator comprising a tower and a nacelle which is supported by the tower and which houses at least the hydraulic pump,
  wherein the power generating apparatus of the renewable energy type comprises:
    a transformer room which is provided in the tower or on an outer periphery of the tower and in which a transformer is provided; and
    a transformer-room cooler which is connected in series or in parallel to the cooling-medium line and which cools the air in the transformer room by the cooling medium that is cooled by the heat exchanger and supplied to the transformer room via the cooling-medium line, and
  wherein the cooling medium is water to which antifreeze is added.

10. The power generating apparatus of the renewable energy type according to claim 2,
  wherein the power generating apparatus of the renewable energy type is a wind turbine generator comprising a tower and a nacelle which is supported by the tower and which houses at least the hydraulic pump, and
  wherein the ambient fluid is air.

11. The power generating apparatus of the renewable energy type according to claim 10,
  wherein the heat exchanger is arranged on an upper part of the tower or in the nacelle.

12. The power generating apparatus of the renewable energy type according to claim 2,
  wherein the power generating apparatus of the renewable energy type is an offshore wind turbine generator which is installed offshore and which comprises a tower and a nacelle supported by the tower and which houses at least the hydraulic pump, and
  wherein the ambient fluid is seawater.

13. The power generating apparatus of the renewable energy type according to claim 12,
  wherein the heat exchanger and a transformer room in which a transformer is provided are arranged on a lower part of the tower, and
  wherein the cooling-medium line extends to the lower part of the tower.

14. The power generating apparatus of the renewable energy type according to claim 9,
  wherein at least one of the tower and the nacelle is hermetically closed from ambient air.

15. The power generating apparatus of the renewable energy type according to claim 9,
  wherein one of the tower and the nacelle has an intake port and an exhaust port to air-cool air in said one of the tower and the nacelle, and
  wherein a filter is provided in the intake port and the exhaust port to block a corrosive substance contained in the ambient air.

16. The power generating apparatus of the renewable energy type according to claim 15,
  wherein at least one fan is provided in one of the tower and the nacelle,
  wherein a shutter being capable of opening and closing freely is provided in the intake port and the exhaust port,
  wherein, when a temperature inside one of the tower and the nacelle is higher than a prescribed temperature, the shutter opens to ventilate the air in said one of the tower and the nacelle in a ventilation mode, and
  wherein, when the temperature inside one of the tower and the nacelle is not higher than the prescribed temperature, the shutter closes to circulate the air in said one of the tower and the nacelle in a circulation mode.

* * * * *

UNITED STATES PATENT AND TRADEMARK OFFICE
CERTIFICATE OF CORRECTION

| | |
|---|---|
| PATENT NO. | : 8,601,804 B2 |
| APPLICATION NO. | : 13/294065 |
| DATED | : December 10, 2013 |
| INVENTOR(S) | : Yu Akashi et al. |

Page 1 of 1

It is certified that error appears in the above-identified patent and that said Letters Patent is hereby corrected as shown below:

On the title page, the Related U.S. Application Data information should read as follows:

item (63) Continuation of application No. PCT/JP2011/068284, <u>on August 10, 2011.</u>

Signed and Sealed this
Sixth Day of January, 2015

Michelle K. Lee
*Deputy Director of the United States Patent and Trademark Office*